United States Patent [19]

Iwahara

[11] Patent Number: 5,506,831
[45] Date of Patent: Apr. 9, 1996

[54] METHOD FOR CONTROLLING A HEAD DURING A STARTING OPERATION OF A DISK STORAGE DEVICE

[75] Inventor: Masahiko Iwahara, Nagano, Japan

[73] Assignee: Fuji Electric Co., Ltd., Japan

[21] Appl. No.: 240,592

[22] Filed: May 10, 1994

[30]   Foreign Application Priority Data

May 11, 1993   [JP]   Japan ................................. 5-108626

[51] Int. Cl.$^6$ ..................................................... G11B 7/24
[52] U.S. Cl. ........................................... 369/275.3; 369/32
[58] Field of Search ............................... 369/275.3, 32, 369/275.1, 279, 276, 54, 55, 56, 57, 58, 44.26, 44.28; 360/78.04, 78.14, 78.08, 78.11, 77.11

[56]   References Cited

U.S. PATENT DOCUMENTS

| | | | |
|---|---|---|---|
| 4,823,212 | 4/1989 | Knowles et al. | 360/78.14 |
| 5,079,654 | 1/1992 | Uno et al. | 360/78.14 |
| 5,371,724 | 12/1994 | Uno | 369/32 |
| 5,379,166 | 1/1995 | Tsukada et al. | 360/78.14 |

FOREIGN PATENT DOCUMENTS 57-103136   6/1982   Japan ................................. 369/275.3

*Primary Examiner*—Georgia Y. Epps
*Assistant Examiner*—Tan Dinh
*Attorney, Agent, or Firm*—Parkhurst, Wendel & Rossi

[57]   ABSTRACT

Elimination of mis-detection of a front erasure section of reference information for controlling the position of a read/write head on the disk storage device is accomplished, by zoning a part of a disk surface for a specific zone RZ separately from a data storage zone DZ, storing a dummy data Dd in a code pattern with a predetermined repetition cycle in an entire area, excluding areas for reference information storage, of the specific zone RZ, and positioning a read/write head in the specific zone RZ to detect a front erasure section ER of the reference information RI by a reference information read out means 30. The read out means 30 reads out of an identification section ID and a servo information section SI of the reference information RI securely without being confused by fake erasure sections.

6 Claims, 2 Drawing Sheets

METHOD FOR CONTROLLING A HEAD DURING A STARTING OPERATION OF A DISK STORAGE DEVICE

FIELD OF THE INVENTION

The present invention relates to a method of starting a disk storage device that supports, in a transient period immediately after the disk storage device is started, operation of a reference information read out means for reading out reference information employed for controlling position of a read/write head of the disk storage device.

BACKGROUND

Number of recording tracks on a memory disk has been increased and track pitch has been narrowed to meet requirement of down-sizing and increasing storage capacity of the disk storage device. In association with this, more improvement in position control accuracy of the read/write head of the disk storage device has been required. To meet this improvement requirement, a so-called sector servo method has been widely employed. In the sector servo method, reference information including servo information is stored on the same memory surface of the disk for storing read/write data. The reference information is stored in a plurality of zones distributing along a circumferential direction of the disk between sectors for storing the read/write data. The sector provides a storage unit for storing data. The outline of the sector servo method is explained below referring to FIG. 2, though the method is well known.

FIG. 2(a) is an expanded view schematically showing a part of the disk surface in which three tracks T are shown. Reference information RI is stored in the disk and distributed along a circumferential direction of the disk which corresponds to the horizontal direction of FIG. 2(a). Sectors, as the data storage units are defined, are located on the tracks T between the stored reference information RI. As is well known, the reference information RI is stored first on the disk surface to define the tracks T and then the sectors are defined on each track by applying so-called formatting. FIG. 2(b) shows an expanded view of a portion cut out by two fine lines from FIG. 2(a) placing the reference information RI in its center. As shown in FIG. 2(b), the reference information RI consists usually of a front erasure section ER in which data is not stored, an identification section ID in which track address data is stored, and a servo information section SI for detecting a position of the read/write head. On the left hand side of the reference information RI, data Dg is stored on the tail portion of the sector S. On the right hand side of the reference information RI, a synchronous code Sy or the like is stored on the head portion of the sector S.

The narrow erasure section ER indicates that the identification section ID or the servo information section SI comes next. In the identification section ID, the track address data is stored by so-called Gray code so that the head may read the track address data even when the head is moving. In the servo information section SI, servo information is divided into four parts in the circumferential direction of the disk, usually designated as burst servo, which are displaced one by one in a predetermined manner in the radial direction of the disk, which corresponds to the vertical direction of FIG. 2(b). A reference information read out means, built in the disk storage device, detects the erasure section ER from an analog signal obtained by reading out the memory content by the read/write head 3. Then in synchronous with the detected erasure section ER, the reference information read out means reads out the identification section ID and the servo information section SI one by one. A head position control means of the disk storage device locates the head 3 on a designated track referring to the read out identification section ID and centers the head 3 on the track referring to the read out servo information section SI.

The disk storage device controls head position throughout its operation period by always reading out the reference information stored on the disk surface. However, the disk storage device, though rarely, fails to shift to read/write operation immediately after an electric power supply is connected to the disk storage device to start the device until the reference information read out means reaches its steady state of operation. This is because, in a transient period immediately after the disk storage device is started, the reference information read out means fails to read out reference information having the erasure section in its head portion, and so fails to identify the head position at the start of the disk storage device based on which the disk storage device conducts read/write operation. Factors which cause this failure in reading out the reference information in an early stage of starting the device will be explained below with reference to FIG. 3.

FIG. 3 shows wave forms of an analog read out signal RSa obtained by reading out the erasure section ER located in the head portion of the reference information RI and its vicinity shown in FIG. 2(a) by the head 3. FIG. 3(a) shows a normal wave form obtained when the reference information RI is successfully read out. In FIG. 3(a), the read out signal RSa shows zero amplitude in the portion corresponding to the erasure section ER. The amplitude of the read out signal RSa, which corresponds to the identification section ID or the data Dg located in the tail portion of the sector S which comes in advance to the reference information RI, does not keep zero amplitude though the signal oscillates between positives and negatives. In contrast to this, when the head 3 is positioned on a gap g between the tracks as shown by 3a in FIG. 2(b), the amplitude of the read out signal RSa tends to be small as shown in FIG. 3(b). In addition to this, the signal RSa may keep showing close to zero amplitude as indicated by Ef in FIG. 3(b), when unfavorable conditions accumulate, because the data Dg coming in advance to the erasure section ER may differ from a track to another as shown in FIG. 2(b).

Since the reference information read out means detects the position of the reference information RI by detecting the erasure section ER as described above, the reference information read out means tries to detect the reference information RI at an incorrect moment and fails in detection when a fake erasure section appears in the read out signal RSa as shown in FIG. 3(b). Probability of the mis-detection described above becomes higher as the position of the head 3 deviates more from the center of the track and when the disk storage device is started. At the start of the disk storage device, the head 3 is not always properly located. In the steady state operation of the disk storage device, one or two mis-readings out of the reference information may occur but they do not cause serious troubles, because the position of the head 3 is controlled by the head position control means and present position of the head 3 is always memorized.

In view of the foregoing, an object of the present invention is to provide a method of starting a disk storage device that prevents the device from failing to start caused by an error in reading out the reference information.

SUMMARY OF THE INVENTION

The object of the present invention is achieved by a method of starting a disk storage device, having a read/write head and a reference information read out means, and on a surface of a disk of the device reference information for controlling position of the head is stored locating an erasure section in a head portion of the reference information, which comprises following steps: (a) zoning the surface of the disk for a specific zone and a read/write data storage zone, and defining a plurality of reference information zones, extending along radial direction of the disk, across the specific zone data storage zones; (b) storing dummy data in an entire area of the specific zone except the reference information zones when storing the reference information in the reference information zones prior to starting the disk storage device; (c) positioning the head in the specific zone when the disk storage device is started and detecting the erasure section of the reference information by the reference information read out means; and (d) bringing the head into the data storage zone.

It is preferable to define the specific zone in a peripheral portion of the disk surface and it is preferable the specific zone has a width that contains a plurality of tracks, from three to several tracks for example. It is preferable to store the dummy data by a uniform code pattern with a predetermined repetition cycle. It is especially preferable to employ the same code pattern for the dummy data and for the servo information of the reference information, and to store the code pattern in an entire area of the specific zone including gaps between the tracks but excluding the reference information zones, at the same time when the reference information is stored. It is also preferable to bring the head into the specific zone only when the reference information read out means does not operate normally in the data storage zone.

BRIEF DESCRIPTION OF THE DRAWINGS

The invention will now be discussed in greater detail with reference to the accompanying drawings, wherein:

FIG. 1 a diagram for explaining on embodiment according to the present invention in which

FIG. 3 shows wave forms for explaining the problem in the prior art in which

DETAILED DESCRIPTION OF THE PREFERRED EMBODIMENT

The present invention solves the aforementioned problem of the prior art disk storage device by zoning the memory surface of the disk for the independent specific zone and data storage zone, considering the appearance of the fake erasure section on the read out signal is caused by complex factors including code pattern stored on adjacent tracks, head position and so on, and difficulties of removing the such factors in the zone in which the read/write data is stored. Therefore, according to the present invention, reference information for supporting an early stage of operation of the reference read out means is stored in the specific zone in the same manner as in the data storage zone, and dummy data is stored in the entire specific zone except the reference information zones. And, according to the present invention, the read/write head is brought into the specific zone, and the reference information and the dummy data are read out by the reference information read out means when the disk storage devices is started.

The method of starting the disk storage device according to the present invention, expels any probability that the dummy data stored outside the data storage zone is replaced or over-written when the read/write data is written in or read out from the data storage zone. And the method of the present invention expels any continuation of zero amplitude in the signal obtained through the read/write head by reading the dummy data in advance to the erasure section located in the head portion of the reference information, because the head reads the same dummy data irrespective of its radial position as far as the head is located in the specific zone. Accordingly, the method of the present invention brings the reference information read out means into its steady state of operation by detecting the real erasure section without being cheated by fake erasure sections.

Although the fake erasure section may be prevented by storing the dummy data on the gaps between the tracks in the data storage zone, it causes other problems: error in reading out the read/write data may be caused by the stored the dummy data or the stored dummy data may be erased by storing the read/write data when the head is located away from the track center.

Figure 1A:
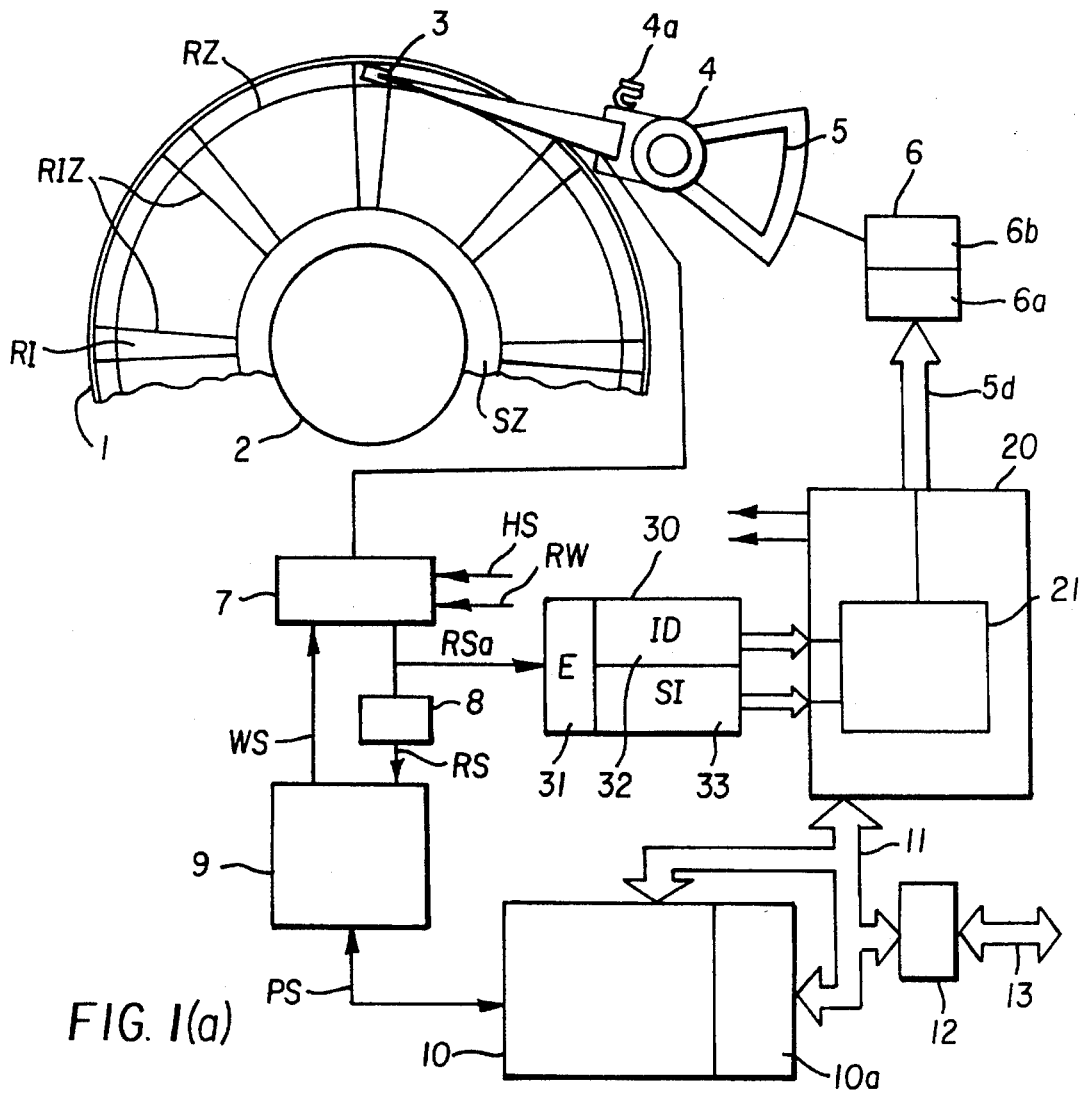
FIG. 1(a) is a block diagram schematically showing constitution of the disk storage device to which the present method is employed.
Figure 1B:
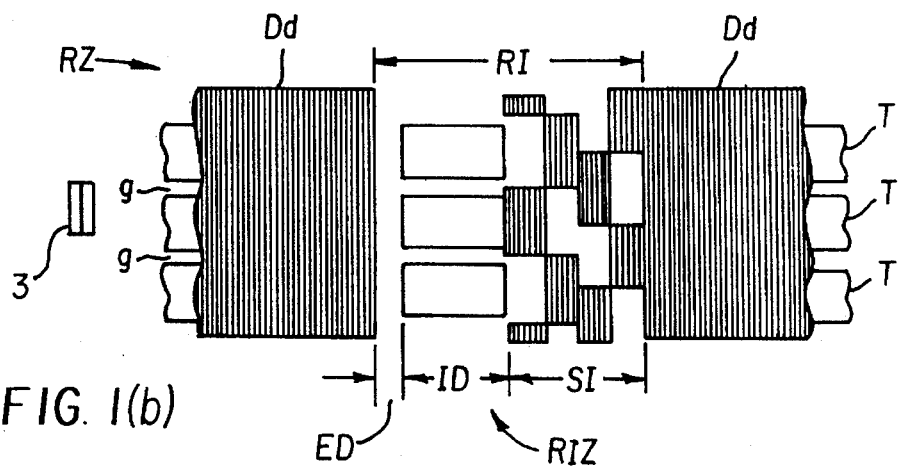
FIG. 1(b) is an expanded view of the disk surface showing a main portion of the specific zone.

The method of starting the disk storage device according to the present invention is explained referring to FIG. 1. FIG. 1(a) is a block diagram schematically showing the structure of the disk storage device to which the present method is employed. FIG. 1(b) is an expanded view of the disk surface showing a main portion of a specific zone. In the present invention, the contents of the reference information RI stored in the data storage zone DZ of the disk and the contents of sector S are the same with those in the prior art.

The outline of the configuration and circuit of the disk storage device will be explained first with reference to FIG. 1(a). According to the present invention, a specific zone RZ and a data storage zone DZ as well as an innermost shipping zone SZ are defined in the surface of a disk 1, a half part of which is shown on the upper left portion of FIG. 1(a). Though the specific zone RZ may be defined anywhere as far as the zone RZ does not overlaps the data storage zone DZ, the outermost portion of the disk 1 is zoned for the specific zone RZ extending usually over 3 to 5 tracks in this embodiment. The reference information RI, details of which are shown in FIG. 1(b), is stored for the data storage zone DZ and specific zone RZ in a plurality of zones RIZ distributing along the circumferential direction of the disk 1, by which the tracks T of FIGS. 1(b) and 2 are defined as described above.

As usual, the disk 1 is driven at a predetermined speed by a spindle motor 2. The read/write head 3 is supported on a rocking access arm 4 and its position is controlled along the radial direction of the disk 1 by an actuator 5 which comprises a voice coil motor or the like. A drive circuit 6 comprises a D-A converter circuit block 6a that receives a digital drive command Sd from a servo control processor 20 and a drive circuit block 6b for the actuator 5. A read/write circuit 7 connected to a plurality of heads 3 of the disk storage device receives a head selection command HS and a read/write command RW from the servo control processor 20 and brings the head 3 selected by the head selection signal HS to read-out or write-in mode in response to the read/write command RW. A demodulation circuit 8 receives an analog read out signal RSa from the read/write circuit 7, converts the signal RSa to a read out signal RS of a digital pulse train by a predetermined modulation method like the run length limited coding (RLL) and supplies the signal RS to a signal processing circuit 9. The signal processing circuit 9 supplies a write in signal WS of a digital pulse train according to the aforementioned modulation method to the head 3 via the read/write circuit 7. In the signal processing circuit 9 briefly described in FIG. 1(a), an sync separator circuit and an encoder/decoder circuit for the read out signal RS and the write in signal WS are usually included.

A data control processor 10 is provided for controlling data to be written in or to be read out. The data control processor 10 receives the content of the signal RS in the form of a pulse train signal PS from the signal processing circuit 9, converts the received signal PS to a data and then supplies the data from a RAM 10a to a host computer, not shown in FIG. 1(a), via an internal bus 11, an interface circuit 12 and an external bus 13. The data control processor 10 converts a command or a data supplied from the computer via the reverse path to the pulse train signal PS and supplies the converted pulse train signal PS to the signal processing circuit 9. The signal processing circuit 9 writes the supplied pulse train PS on the disk 1 in the form of write in signal WS through the read/write circuit 7 and the head 3. The servo control processor 20 is provided for controlling shifting and positioning of the head 3. The servo control processor 20 supplies the aforementioned drive command Sd from the head position control means 21, stored as software in the processor 20, to the drive circuit 6 and controls position of the head 3 through the actuator 5. The servo control processor 20 operates in cooperation with the data control processor 10 through the internal bus 11.

Figure 2A:
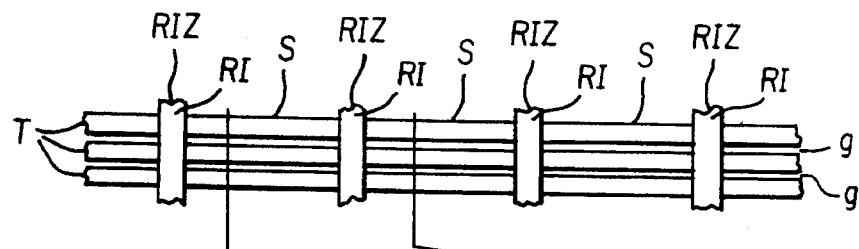
FIG. 2 is a diagram showing a prior art data storage zone in which FIG. 2(a) schematically shows the location of the reference information zones and the sectors.
FIG. 2(b) is an expanded view showing a main portion of FIG. 2(a)
Figure 2B:
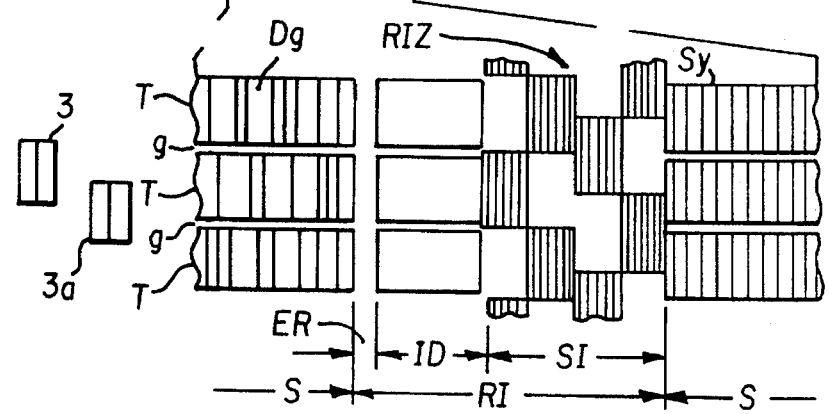
Figure 3A:
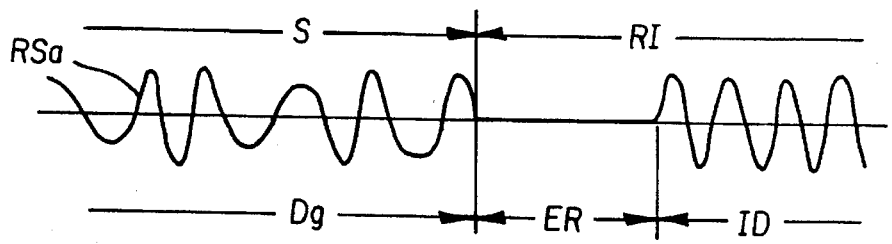
FIG. 3(a) shows a normal wave form of the read out erasure section and data stored in the sector.
Figure 3B:
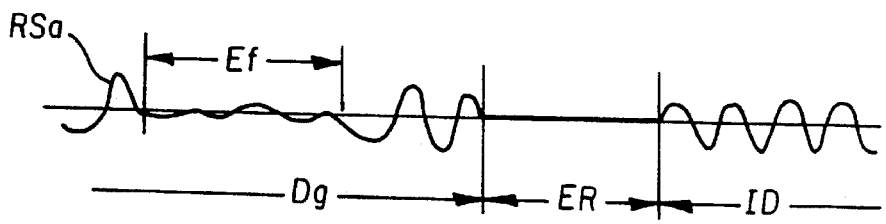
FIG. 3(b) shows an abnormal wave form of the same.

Though the disk storage device described above comprises usual constituent elements except the specific zone RZ, a reference information read out means 30 is provided in this embodiment solely for receiving the analog read out signal RSa from the read/write circuit 7. Since the reference information RI consists of the erasure section ER, identification section ID and servo information section SI in the same manner as the prior art as shown in FIG. 2(b), the reference information read out means 30 consists also of an erasure section read out block 31, an identification section read out block 32 and a servo information section read out block 33. The identification section read out block 32 and the servo information section read out block 33 read out each section of information assigned to them at the timing indicated by the erasure section read out block 31, and supplies their read out results to the head position control means 21 stored in the servo control processor 20. FIG. 1(b) shows a storing scheme of the reference information RI and the dummy data Dd in the specific zone RZ according to the present invention. As show by the figure, the reference information RI is stored in the specific zone RZ in the same manner as in the data storage zone DZ of FIG. 1(a). Since the reference information RI is stored very often by an accurate servo writer for exclusive use through the head 3, it is preferable to store the dummy data Dd in the entire specific zone RZ except the reference information zones RIZ at the same time when the reference information RI is stored. It is preferable to store the dummy data Dd with a predetermined repetition cycle in a simple uniform code pattern consisting for example of "0" and "1". In this embodiment, the dummy data Dd is stored in the same code pattern with the servo information SI of the reference information RI having the same repetition cycle and content as shown in FIG. 1(b). It is also preferable to store the dummy data Dd simultaneously in the entire specific zone RZ, including gaps g between the tracks T but excluding the reference information zones RIZ, and in each part of the servo information SI.

In storing the reference information RI and the dummy data Dd, servo information SI is stored for defining tracks T by the aforementioned servo writer after bringing the entire memory surface of the disk 1 to an erased state by storing a data with a predetermined pattern or direct current of "0" or "1". Since it is necessary to store the servo information section SI in the four parts over the entire width of the specific zone RZ along the radial direction of the disk 1 including the gaps g between the tracks T as shown in FIG. 1(b) by displacing the head 3 little by little along the radial direction of the disk 1, the dummy data Dd can be stored in the entire specific zone RZ excluding the reference information zones RIZ by storing the dummy data Dd at the same time when storing the servo information section SI.

Information storage in the specific zone RZ is completed by storing the identification section ID on the tracks T by the usual Gray code after or simultaneously with storing the servo information section SI and the dummy data Dd as described above. The sectors S are defined as shown in FIG. 2(a) by storing the reference information RI and the servo information section SI in the data storage zone DZ in the same manner as in the specific zone RZ and by applying the formatting to the defined tracks T. Thus, the disk is brought into a state in which reading out from the specific zone RZ and writing in the data storage zone DZ can be conducted.

In the disk storage device, in which a part of the surface of the disk 1 is zoned for the specific zone RZ according to the present invention, the reference information read out means 30 detects the erasure section ER of the reference information RI after bringing the head 3 into the specific zone RZ as shown in FIG. 1(a) at its start when a power supply is connected to the device. When the disk storage device is started, the disk storage device brings the head 3 by the actuator 5 to the outermost periphery of the disk 1 by supplying drive command Sd from the head control circuit 21 to the drive circuit 6, until the rocking access arm 4 contacts with a elastic stopper 4a in the embodiment shown in FIG. 1(a), and simultaneously puts the read/write circuit 7 into read out operation by the read/write command RW.

In this occasion, since the entire specific zone RZ except the reference information zones RIZ is occupied by the dummy data Dd, an intermission never occurs in the analog signal wave form obtained by reading out the dummy data Dd that comes in advance to the reference information RI irrespective of radial position of the head 3 as far as the head 3 is positioned in the specific zone RZ. Accordingly, the erasure section ER in the head portion of each reference information RI can be detected surely by the erasure section read out block 31 of the reference information read out means 30, and the identification section read out block 32 and the servo information read out block 33 can be operated at the timing indicated by the erasure section read out block 31.

The read out identification section ID and servo information section SI are fed from the reference signal read out means 30 in the digital values to the head position control means 21 of the servo processor 20. Though the exact value of the identification section ID is not always obtained since the head position is not accurately located initially, exact value of the servo information section SI is always obtained as far as the erasure section ER is detected accurately.

In the case in which the servo information section SI is divided into four parts as shown in FIG. 1(b), the values read out from the front two indicate displacement of the head 3 from the center of a gap between the tacks T, and those from the rear two indicate displacement of the head 3 from the center of the track T respectively. So the head position control means 21 brings the head 3 to the center of the track T by the drive command Sd by referring to those read out values so as to equalize the read out values from the rear two. Once the head is positioned at the center of the track T, the identification section ID can be read out surely.

Since the reference information read out means 30 and the head position control means 21 are brought into their normal operation state by the measures described above, the head position control means 21 sends a start completion signal indicating that the reference information read out means 30 is already conducting its normal operation to the data control processor 10, after storing present track address read out from the identification section ID, to complete the starting operation of the disk storage device. Once the starting operation is completed, the head position control means 21 shifts the head 3 from the specific zone RZ onto a designated track in the data storage zone DZ when a command signal is fed from the data control processor 10 to the servo control processor 20 based on a command from the host computer. It is preferable to assign track addresses which clearly distinguish the identification section ID in the specific zone from that in the data storage zone DZ. Though the head 3 is always brought into the specific zone RZ as soon as the disk storage device is started in the embodiment described above, it is also preferable to shift the head 3 to the specific zone RZ only when the head 3 is detected in the data storage zone DZ and the reference information read out means 30 is still not in its normal state of operation.

As explained above, the present invention has been done considering the difficulty in completely expelling mis-reading of the erasure section located on the head portion of the reference information caused by complex factors, affecting to reading out the reference information in the data storage zone, like head position or data stored on neighboring tracks. According to the present invention, the reference information read out means of the disk storage can be brought securely into its normal state of operation, without being cheated as in the prior art by the fake erasure section in the read out signal, by defining the specific zone separately from the data storage zone, by completely occupying the entire specific zone with the reference information and the dummy data, and by positioning the head in the specific zone when the disk storage device is started.

The invention has been described with reference to certain preferred embodiments thereof. It will be understood, however, that modifications and variations are possible within the scope of the appended claims.

What I claim is:

1. A method of starting a disk storage device, having a read/write head coupled to a reference information read out means, by locating an erasure section in a head portion of reference information stored on a surface of a storage disk, said method comprising the steps of:
   (a) zoning said surface of said disk for a specific zone and a read/write data storage zone, and defining a plurality of reference information zones across said specific zone and said read/write data storage zone, wherein a portion of each of said reference information zones overlaps the specific zone;
   (b) storing dummy data in an entire area of said specific zone except the portion of each of said reference information zones that overlaps the specific zone
   (c) storing said reference information in said reference information zones, wherein said reference information includes an identification section comprising a plurality of data tracks separated by gaps located therebetween and said erasure section; and
   (d) positioning said head in said specific zone when said disk storage device is started and detecting said erasure section of said reference information using said reference information read out means based on a signal generated from said head as it reads the dummy data and the erasure section;
   wherein said specific zone has a width at least as great as a width of the plurality of data tracks and the gaps located therebetween of the identification section, and wherein the dummy data is stored across the entire width of the specific zone.

2. A method of starting a disk storage device as claimed in claim 1, wherein a peripheral portion of said surface of said disk is zoned for said specific zone.

3. A method of starting a disk storage device as claimed in claim 1, wherein said dummy data is stored in said specific zone in a code pattern with a predetermined repetition cycle.

4. A disk storage device comprising:
   (a) a read/write head and an information storage disk;
   (b) means for zoning a surface of the information storage disk for a specific zone and a read/write data storage zone, and for defining a plurality of reference information zones across said specific zone and said read/write data storage zone, wherein a portion of each of said reference information zones overlaps the specific zone;
   (b) means for storing dummy data in an entire area of said specific zone except the portion of each of said reference information zones that overlaps the specific zone and for storing reference information in said reference information zones, wherein said reference information includes an identification section comprising a plurality of data tracks separated by gaps located therebetween and an erasure section; and
   (c) means for positioning said head in said specific zone when said disk storage device is started; and
   (d) reference information read out means coupled to said head for detecting said erasure section of said reference information based on a signal generated by said head as it reads the dummy data and the erasure section;
   wherein said specific zone has a width at least as great as a width of the plurality of data tracks and the gaps located therebetween of the identification section and the dummy data is stored across the entire width of the specific zone.

5. A disk storage device as claimed in claim 4, wherein a peripheral portion of said surface of said disk is zoned for said specific zone by said means for zoning.

6. A disk storage device as claimed in claim 5, wherein said dummy data is stored in said specific zone in a code pattern with a predetermined repetition cycle.

* * * * *